United States Patent [19]

Ishii et al.

[11] Patent Number: 5,146,251
[45] Date of Patent: Sep. 8, 1992

[54] CAMERA WITH ELECTRONIC FLASH UNIT

[75] Inventors: Shizuo Ishii; Masao Yokoyama, both of Hachioji, Japan

[73] Assignee: Konica Corporation, Tokyo, Japan

[21] Appl. No.: 667,338

[22] Filed: Mar. 11, 1991

Related U.S. Application Data

[62] Division of Ser. No. 470,354, Jan. 25, 1990, Pat. No. 5,028,943.

[30] Foreign Application Priority Data

Jan. 27, 1989 [JP] Japan .................................. 1-18357
Jan. 27, 1989 [JP] Japan .................................. 1-18358

[51] Int. Cl.⁵ .............................................. G03B 00/00
[52] U.S. Cl. .................................. 354/145.1; 362/3
[58] Field of Search .............. 354/126, 145.1, 149.1, 354/149.11, 288, 62; 355/67; 362/3, 16

[56] References Cited

U.S. PATENT DOCUMENTS 3,767,908 10/1973 Ackerman et al. ................. 240/1.3
4,317,625 3/1982 Van Allen ....................... 354/145.1
4,756,613 7/1988 Okashita ............................ 354/62 X

FOREIGN PATENT DOCUMENTS 1548160 12/1967 France .

OTHER PUBLICATIONS

Japanese Patent Abstract No. 58-160936 for a Flash Photographing Device, vol. 7 No. 286 (p-244)(1431), Dec. 21, 1983.
Japanese Patent Abstract No. 57-119332, Jul. 24, 1982, for a Flash Device.

*Primary Examiner*—L. T. Hix
*Assistant Examiner*—Howard B. Blankenship
*Attorney, Agent, or Firm*—Finnegan, Henderson, Farabow, Garrett and Dunner

[57] ABSTRACT

In a camera with an electronic flash unit, an end portion of a reflector of the electronic flash unit is fixed to a camera main body, and the reflector is held by a press member and a cover which covers the camera main body.

15 Claims, 7 Drawing Sheets

CAMERA WITH ELECTRONIC FLASH UNIT

This is a division of application of Ser. No. 07/470,354, filed Jan. 25, 1990, now U.S. Pat. No. 5,028,943.

BACKGROUND OF THE INVENTION

The present invention relates to a camera with a built-in electronic flash unit.

Some cameras have built-in electronic flash units. The flash tube of such a flash unit is covered with a reflector having excellent luminous intensity distribution characteristics.

An electronic flash unit is generally mounted at a predetermined position in such a manner that its reflector is mounted on a light-emission frame, and the light-emission frame is fixed to a circuit board arranged at, e.g., an upper portion of a main body.

If, however, the circuit board is fixed to the upper portion of the main body, and the light-emission frame on which the reflector is mounted in arranged on the circuit board, the circuit board is stacked on the main body and the light-emission frame is further stacked thereon. Such a mounting structure imposes great limitations on reduction in size of a camera.

In another type of camera with a built-in electronic flash unit, the front side of a camera main body is covered with a cover member obtained by printing a window on a transparent member.

If a window is printed in black on part of a transparent member in this manner, the window can be easily formed in one step as compared with, e.g., a case wherein a window hole is formed in an opaque member, and a window is formed by engaging a transparent member with the window hole.

In addition, a window can be formed into an arbitrary shape, and characters, symbols, graphic patters, colors, and the like can be simultaneously formed.

If, however, a flash window is printed on a transparent member by the above-described process method, the print portion constituting the flash window may be burned and discolored or melted by light or heat from the electronic flash unit.

The present invention has been made in consideration of such a situation, and has as its first object to provide a camera with an electronic flash unit in which the reflector of the electronic flash unit is directly mounted on the main body so as to be reliably held, thereby enabling reduction in size of the camera.

It is another object of the present invention to provide a camera with an electronic flash unit which can eliminate the above-described problem associated with the print portion constituting the electronic flash unit.

SUMMARY OF THE INVENTION

In order to achieve the first object, according to the present invention, there is provided a camera with an electronic flash unit, wherein an end portion of a reflector of the electronic flash unit is fixed to a main body, and the reflector is held by a press member arranged therebehind and is also held by a cover covering the main body.

In this collapsible barrel type camera of the present invention, the end portion of the electronic flash unit is directly mounted on the reflector, and this reflector is held by both the press member arranged therebehind and the cover which covers the main body and serves also as a conventional light-emission frame. Therefore, unlike the conventional camera, the light-emission frame and the like for mounting the reflector on the main body can be omitted, and the overall height of the camera can be reduced. Hence, the camera can be reduced in size.

In order to achieve the second object of the present invention, according to the present invention, there is provided a camera with an electronic flash unit whose front side is covered with a cover member formed by printing a flash window on a transparent member, wherein a frame around the flash window of the cover member is constituted by a reflecting film.

In this camera with the electronic flash unit of the present invention, the frame of the flash window of the cover member is formed by printing the reflecting film. With this arrangement, harmful light emitted from the flash tube is reflected by the reflecting film but is not absorbed by the print portion. This prevents the print portion constituting the flash window from being burned and discolored.

DETAILED DESCRIPTION OF THE PREFERRED EMBODIMENTS

Figure 1:
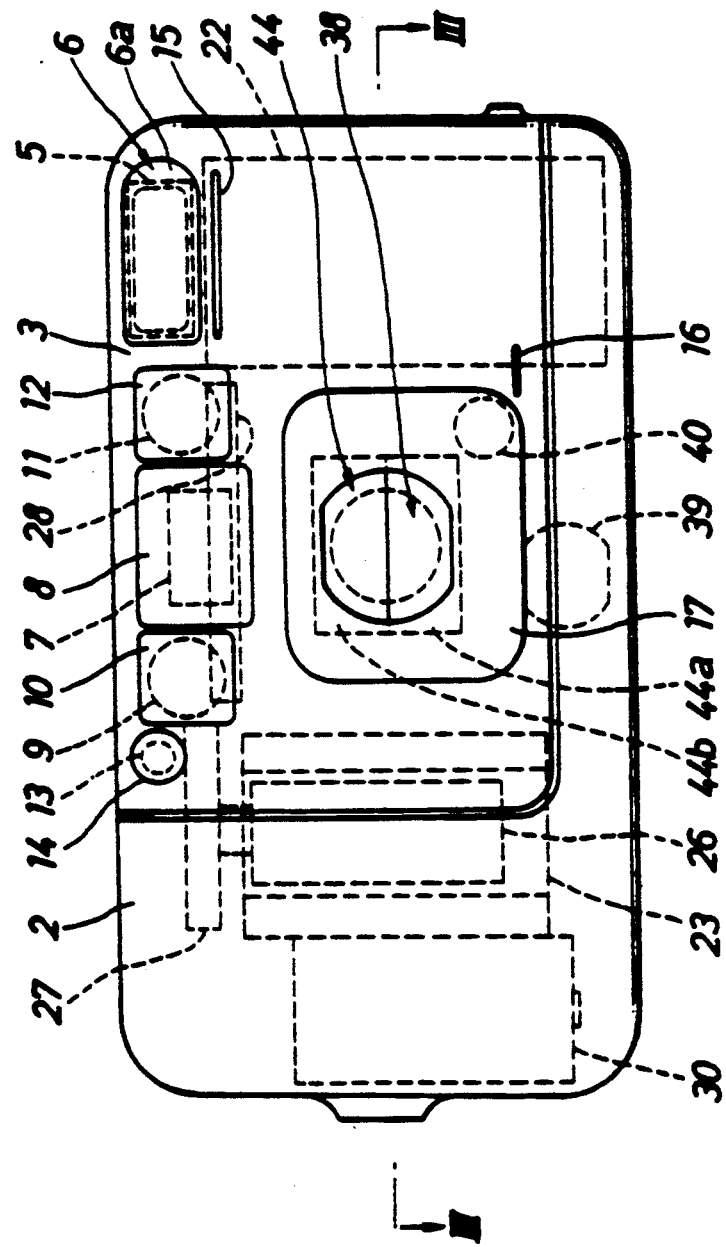
FIG. 1 is a front view of a camera to which the present invention is applied.

Embodiments of the present invention will be described below with reference to the accompanying drawings.

A camera to which the present invention is applied comprises a main body 1, a front cover 2, a decorative panel 3, and a rear cover 4. These components are respectively constituted by synthetic resin members. The decorative panel 3 is engaged with the front side of the front cover 2. This front cover 2 is engaged with the main body 1 so as to cover it and is fastened with screws. Window portions are formed on a transparent member of the decorative panel 3 by transfer. They are: a window portion 6 of an electronic flash unit 5, a window portion 8 of an objective lens of a viewfinder 7, a window portion 10 of a light-emitting AF lens 9, a window portion 12 of a light-receiving AF lens 11, and a window portion 14 of an AE light-receiving element 13. A reflecting film 6a is formed on the window portion 6 of the electronic flash unit 5 so as to prevent the window portion 6 formed by transfer from being burned by light emitted from the electronic flash unit 5. This window portion also serves as a conventional light-emission frame.

In addition, a projection 15 is integrally formed near the lower portion of the window portion 6 so as to prevent a user from placing his/her finger on the window portion 6. Similarly, a projection 16 is integrally formed near the lower portion of a lens barrel 17 so as to prevent the user from placing his/her finger on the lens barrel 17.

The rear cover 4 and a battery cover 18 are integrally attached to a main body mounting member 19 through a hinge shaft 20. This main body mounting member 19 is engaged with the main body 1 and is fixed thereto with screws. The rear cover 4 and the battery cover 18 are attached to the main body mounting member 19 through the hinge shaft 20 in advance so as to constitute a unit. This unit is then mounted on the main body 1.

A patrone chamber 22 and a wind-up chamber 23 are formed in the main body 1 on both the sides of a picture frame 21. A patrone 24 is housed in the patrone chamber 22. An exposed photographic film F is wound up by a reel 25 arranged in the wind-up chamber 23. The wind-up operation of the film is performed by an automatic wind-up scheme using a built-in motor 26. The photographic film F is wound up on the reel 25 upon driving of a wind-up unit 27. An automatic loading scheme is also employed, in which a loading operation is started upon depression of a release button after the rear cover 4 is closed. Upon completion of photography of the last shot, the built-in motor 26 drives a rewind gear system 28 so as to rewind the film. Upon completion of the rewind operation, the built-in motor 26 is automatically stopped.

The main body mounting member 19 mounted on the main body 1 partitions the wind-up chamber 23 and a battery chamber 29. A lithium battery 30 is housed in the battery chamber 29. The user can replace the battery 30 with a new one by opening/closing the battery cover 18. In addition, a button battery 31 is housed in the rear cover 4. This battery 31 serves not only as a power source for automatic dating but also as a backup power source of a main power source.

A press plate 32 is arranged inside the rear cover 4. A tunnel space is defined between the press plate 32 and a film rail 33 formed near the picture frame 21 of the main body 1, thereby allowing the photographic film F to travel through the tunnel space.

A front base plate 34 of a lens barrel unit is arranged between the wind-up chamber 23 of the main body 1 and the patrone chamber 22 so as to oppose the picture frame 21. A lens barrel frame 35 is arranged on the front base plate 34 so as to be freely moved in the optical axis direction by a drive shaft 36 and a guide shaft 37. The lens barrel frame 35 is integrally assembled with the lens barrel 17 having a photographic lens 38. The lens barrel frame 35 rotates the drive shaft 36 through a gear mechanism 40 upon driving of a motor 39, and moves the photographic lens 38 in the optical axis direction. When the lens barrel frame 35 retreats, the photographic lens 38 is withdrawn into the lens barrel 17. The photographic lens 38 consists of four 4-group lenses and is mounted on the lens barrel frame 35 through support members 41 and 42. The photographic lens 38 is of a between type in which a shutter 43 is arranged between lenses. Three lens 38a, 38b, and 38c are made of glass, whereas a lens 38d located on the photographic film side is made of an aspherical plastic member.

The front surface of the photographic lens 38 is covered with a lens barrier 44. This lens barrier 44 is constituted by two divided barriers 44a and 44b, and is opened/closed in one direction upon movement of the photographic lens 38.

The rewind gear system 28 is arranged above the picture frame 21 of the main body 1. In addition, two mounting portions 45 and 46, and a mounting portion 47 are located above the picture frame 21. The mounting portions 45 and 46 are respectively formed for the light-emitting and light-receiving sides of the AF lens arranged on the front base plate 34. The mounting portion 47 is formed for the viewfinder 7 formed between the mounting portions 45 and 46 in the form of a concave shape.

Figure 2:
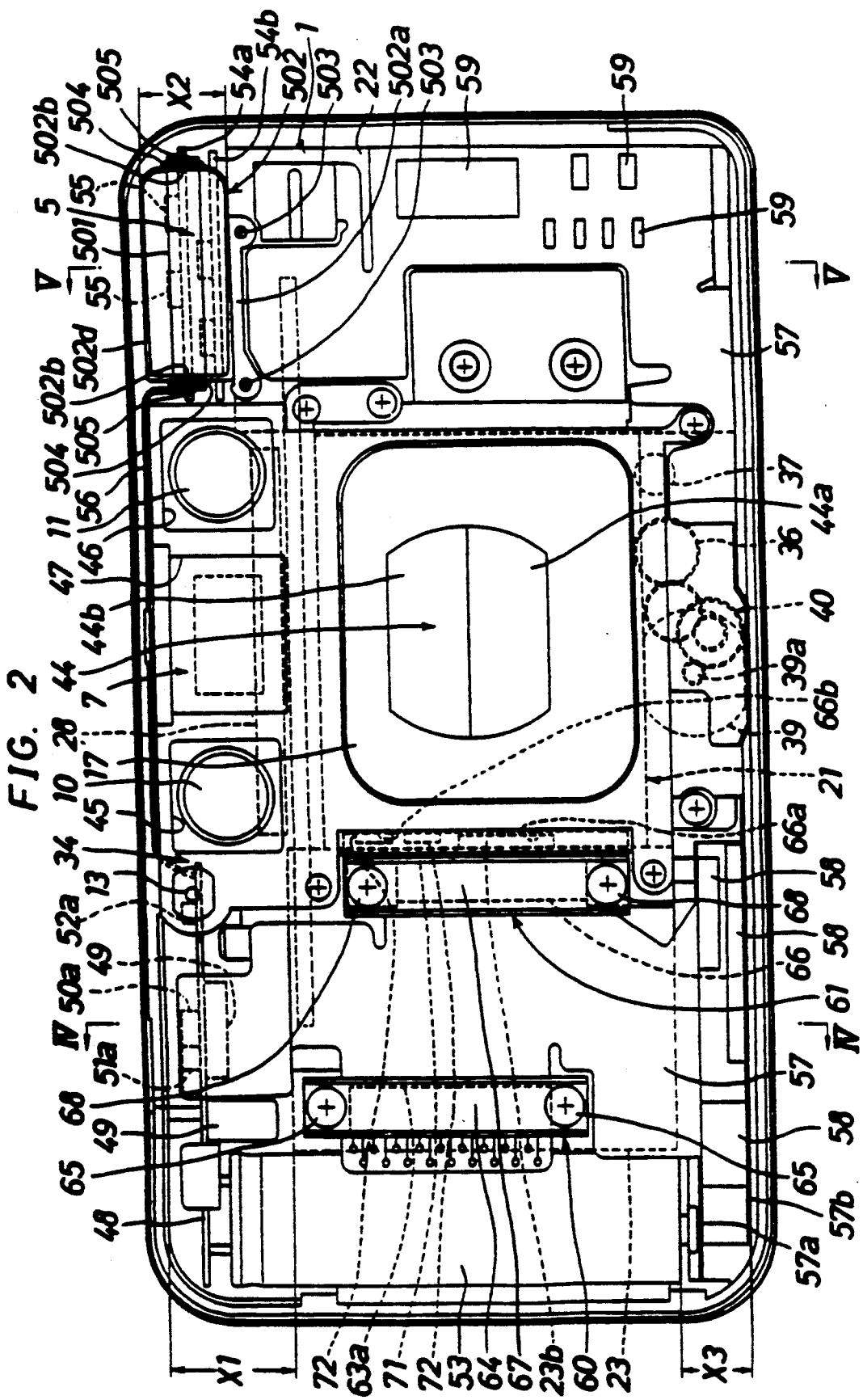
FIG. 2 is a front view of the camera in a state wherein its front cover is removed.
Figure 4:
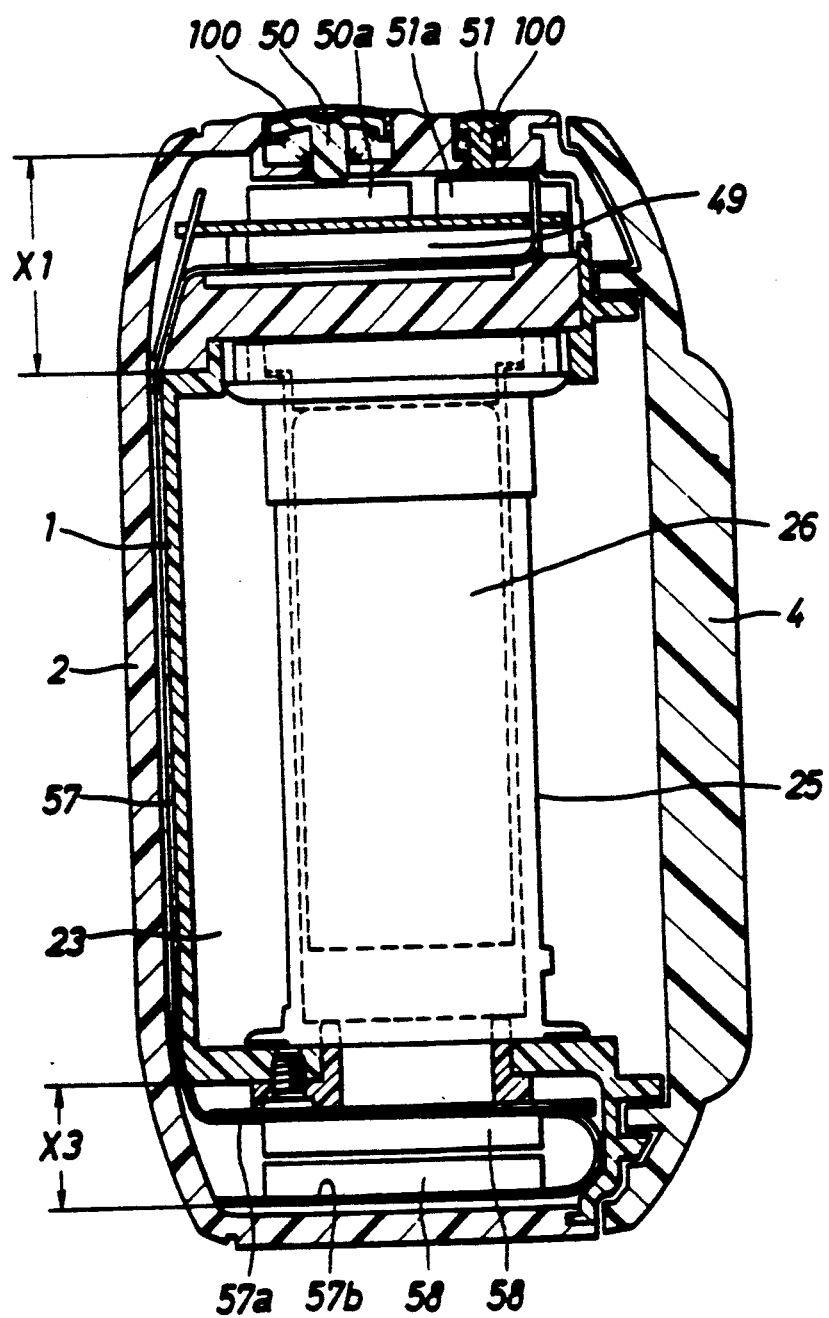
FIG. 4 is a sectional view taken along a line IV—IV in FIG. 2.

As shown in FIGS. 2 and 4, a level difference X1 with respect to the front base plate 34 is defined above the wind-up chamber 23 in the direction of the wind-up shaft. A circuit board 48 is arranged within the level difference X1 and is fastened and fixed with screws 506a. This circuit board 48 incorporates a primary side circuit element 49 of an oscillation system of an electronic flash unit circuit, a switch element 50a of a release button 50, a switch element 51a of a power source button 51, a switch element 52a of a close-up button 52, and the like. With this arrangement, the space above the wind-up chamber 23 is effectively used. In addition, a flash capacitor 53 is connected to the circuit board 48.

The release button 50, the power source button 51, and the close-up button 52 are respectively constituted by resin members, as shown in FIG. 4. The side portion to the upper portion of each button is decorated by depositing a metal 100. However, no metal is deposited on the side of each button which opposes a corresponding switch element, and the resin of that portion is exposed. This prevents discharge between the button and the switch element due to static electricity when the button approaches the switch element upon button operation by a user's finger. Therefore, no high voltage is applied to the input terminal of a microcomputer due to static electric charge, and an operation error can be prevented.

Figure 5:
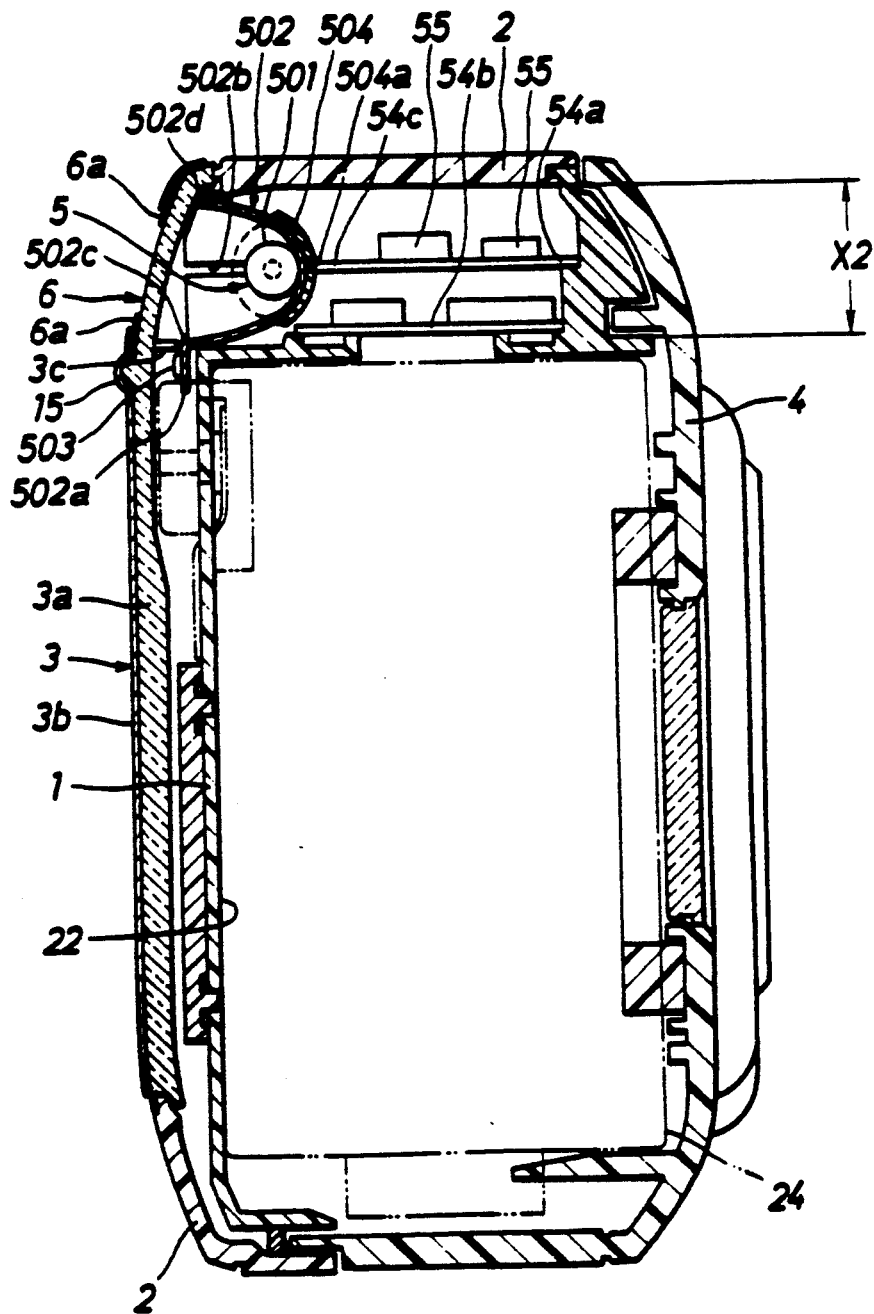
FIG. 5 is a sectional view taken along a line V—V in FIG. 2.
Figure 6:
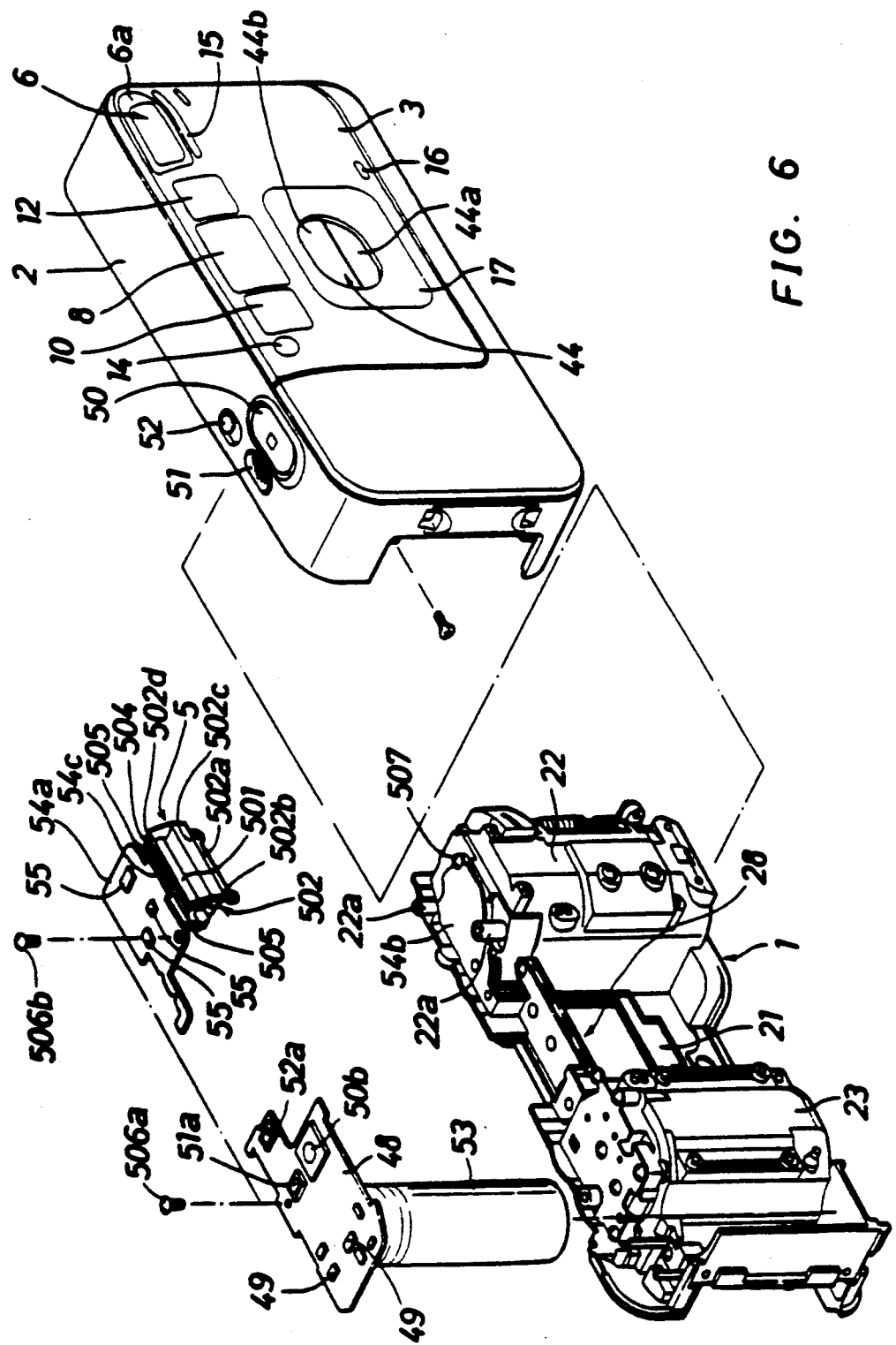
FIG. 6 is an exploded perspective view of a part of the camera.

In addition, a level difference X2 with respect to the front base plate 34 is defined above the patrone chamber 22 in the direction of the wind-up shaft, as shown in FIGS. 2 and 5. A circuit board 54a, a rewind gear press plate 54b, and the electronic flash unit 5 are arranged within this level difference X2.

A flash tube 501 of the electronic flash unit 5 is covered with a reflector 502. This reflector 502 has a rectangular opening on its front side. The entire lower portion of the reflector 502 is bent downward to form a mounting portion 502a. The mounting portion 502a is fixed to the upper portion of the patrone chamber 22 with a projection 503 upon forcible insertion. The entire mounting portion 502a of the reflector 502 is bent downward to increase its strength, thus preventing twisting and the like. The reflector 502 is mounted on the flash tube 501 by inserting both the end portions of the flash tube 501 into notches 502b formed in both the sides of the reflector 502. The flash tube 501 is inserted into a nonconductive elastic band 504, and is brought into tight contact with the inner surface of the reflector 502 by means of the elastic band 504 so as to be reliably held. Since the flash tube 501 is in tight contact with the reflector 502, when a trigger voltage is applied to the reflector 502, the flash tube 501 is excited to discharge.

A lead 505 connected to the flash tube 501 is connected to the circuit board 54a. The circuit board 54a is fastened and fixed to bosses 22a formed on the upper portion of the patrone chamber 22 with screws 506b. The rewind gear press plate 54b arranged below the circuit board 54a is directly fastened and fixed to the upper portion of the patrone chamber 22 with a screw 507. A projection 54c is formed on the front side of the circuit board 54a. This projection 54c is engaged with a notch 504a formed in the elastic band 504 so as to cause the circuit board 54a to hold the reflector 502. Hence, the circuit board 54a serves as a press member.

A lower end portion 502c of the reflector 502 protrudes from an upper end portion 502d. The decorative panel 3 engaged with the front cover 2 covers a portion near these end portions. Since the upper end portion 502d of the reflector 502 does not protrude from the lower end portion 502c, the upper end portion 502d is held by the decorative panel 3 and the front cover 2.

As described above, the reflector 502 is directly fixed to the main body 1, while its rear portion is held by the circuit board 54a and the upper portion 502d is held by the decorative panel 3 and the front cover 2. In comparison with the conventional method of mounting a reflector using a normal light-emission frame, the overall height of the camera can be reduced, and can be reliably held with a simple structure.

The window portion 6 of the electronic flash unit 5 is formed on the decorative panel 3 by printing a print layer 3b on a transparent member 3a. A projection 3c is formed at a position on the decorative panel 3 corresponding to the lower end portion 502c of the reflector 502. Although the projection 3c and the lower end portion 502c of the reflector 502 protrude from the upper end portion 502d, they are almost in tight contact with each other so as to prevent the interior of the camera from being seen through the window portion 6.

A secondary side circuit element 55 of the oscillation system of the electronic flash unit is connected to the circuit board 54a. The primary side circuit board 48, which is arranged separately from the secondary side of the electronic flash unit, is connected to a lead 56 extending along the upper portion of the front base plate 34, thus effectively using the space above the patrone chamber 22. Since the circuit boards 54a and 48 are separately arranged, and the flash capacitor 53 is directly connected to the circuit board 48, the connection can be reliably performed and the connecting operation is facilitated. In addition, this arrangement prevents any voltage drop caused by connection of the flash capacitor 53 using leads.

A level difference X3 is defined below the wind-up chamber 23 and the patrone chamber 22 in the direction of the wind-up shaft. The motor 39 is arranged below the picture frame 21 within the level difference X3 on the patrone chamber 22 side so as to cause a rotating shaft 39a of the motor 39 to be parallel to the optical axis. A flexible printed wiring board 57 is bent such that portions 57a and 57b are arranged on the wind-up chamber 23 side in the form of a U shape. A circuit element 58 is connected to the flexible printed wiring board 57 so as to constitute a main control circuit. The space within the level difference X3 defined below the wind-up chamber 23 and the patrone chamber 22 is effectively used in this manner so as to arrange the motor 39, the lens barrel driving mechanism, the control section, and the like for driving the lens barrel 17. Therefore, no special space for housing these components need be ensured.

First and second connector portions 60 and 61 are respectively formed between the outer wall of the wind-up chamber 23 and the flash capacitor 53 and between the outer wall of the wind-up chamber 23 and the front base plate 34, thus effectively using the space around the wind-up chamber 23. The flexible printed wiring board 57 is fixed to the first connector portion 60 with screws 65 through a press metal fitting 64 and an end portion 63a of a flexible printed wiring board 63 connected to a rear cover circuit 62 of the rear cover 4. The rear cover circuit 62 constitutes a data recording circuit and a display circuit.

The flexible printed wiring board 57 and a front flexible printed wiring board 66 are fixed to the second connector portion 61 with screws 68 through a press metal fitting 67. Similar to the flexible printed wiring board 63, the flexible printed wiring board 57 can be easily and reliably connected to the front flexible printed wiring board 66 without soldering.

Figure 3:
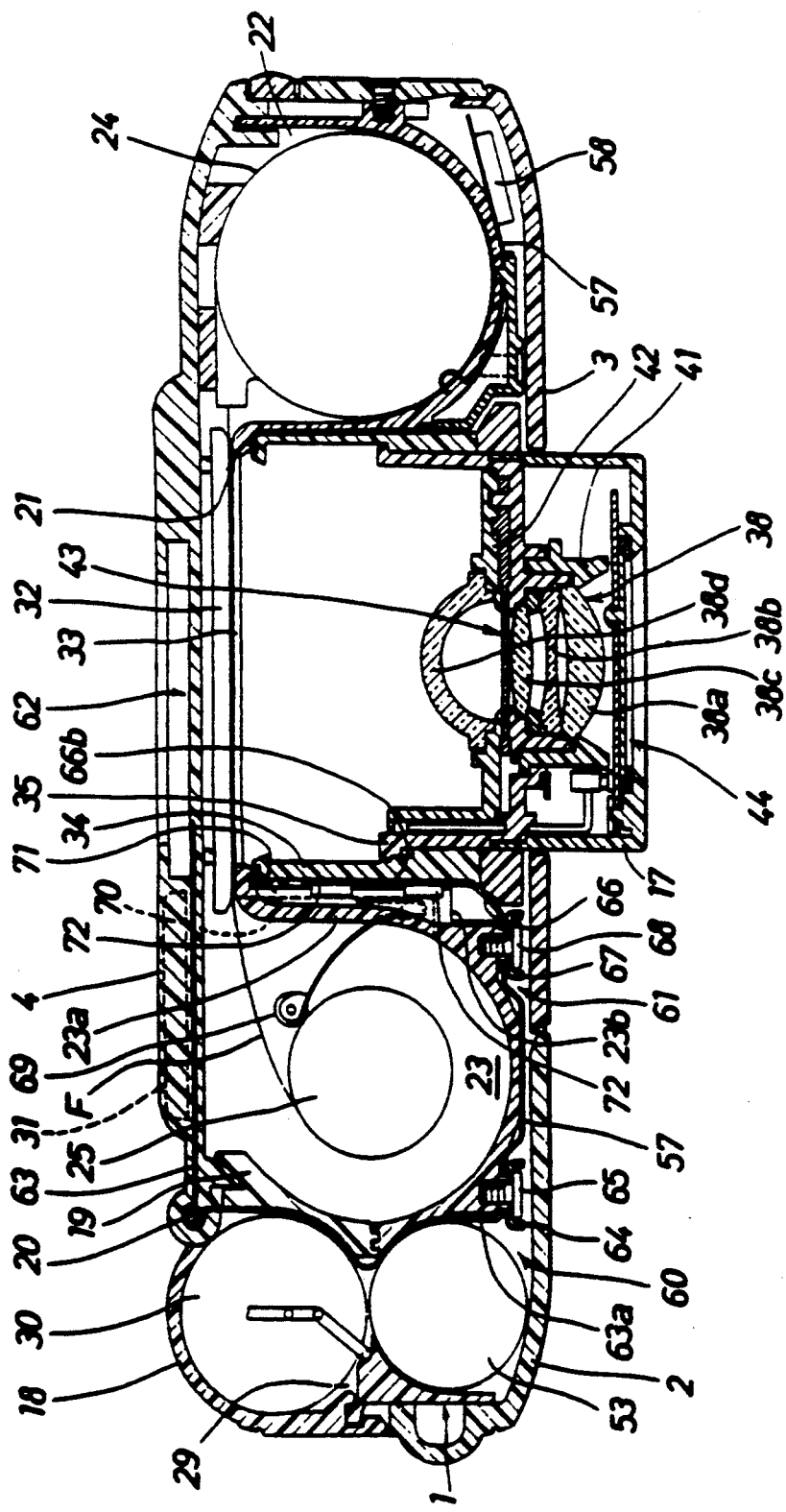
FIG. 3 is a sectional view taken along a line III—III in FIG. 1.

The flexible printed wiring board 66 is arranged between a side wall 23a of the wind-up chamber 23 and the front base plate 34 for supporting the lens barrel 17 on the picture frame 21 side. In order to reliably wind a film around the wind-up shaft, a portion of the side wall 23a constituting the wind-up chamber 23 is caused to protrude toward the picture frame 21 so as to define a mounting space 70 for a film press roller 69 within the wind-up chamber 23 as shown in FIG. 3, and the film press roller 69 is mounted in the mounting space 70. Upon formation of the mounting space 70, a portion (a projection 23b) of the side wall 23a of the wind-up chamber 23 protrudes toward the picture frame 21, and a space 71 is defined between the front base plate 34 and the side wall 23a of the wind-up chamber 23 at the upper and lower positions of the projection 23b. A circuit portion 66a for supplying data to the connector 61 side, which is formed on the flexible printed wiring board 66, is arranged in the space between the projection 23b of the wind-up chamber 23 and the front base plate 34. Circuit parts such as circuit elements 72 are connected to a circuit portion 66b l located in the space 71.

In this manner, the flexible printed wiring board 66 is arranged in the space 71 defined between the side wall 23a of the wind-up chamber 23 and the front base plate 34 upon formation of the projection 23b, and the circuit elements 72 are connected to the board 66. Therefore, no special space for mounting the circuit parts need be ensured.

The flexible printed wiring board 57 is arranged in the camera so as to cover the outer wall of the wind-up chamber 23, be bent at the lower portion of the chamber 23, extend along the lower portion of the motor 39, and cover the outer portion of the patrone chamber 22 on the other side of the lens barrel 17. Circuit elements 59 are connected to the flexible printed wiring board 57. In addition, the board 57 is soldered to the circuit board 48 on the wind-up chamber 23 side.

As described above, according to the present invention, the end portion of the reflector is fixed to the main body, the reflector is held by the press member arranged therebehind, and the cover which covers the main body also serves as a conventional light-emission frame. Therefore, the light-emission frame and the like for mounting the reflector on the main body in the conventional camera can be omitted. Hence the overall height of the camera can be reduced, and the camera can be reduced in size. In addition, the reflector can be reliably held by the press member and the cover which covers the main body. This realizes a simple holding structure.

Figure 7:
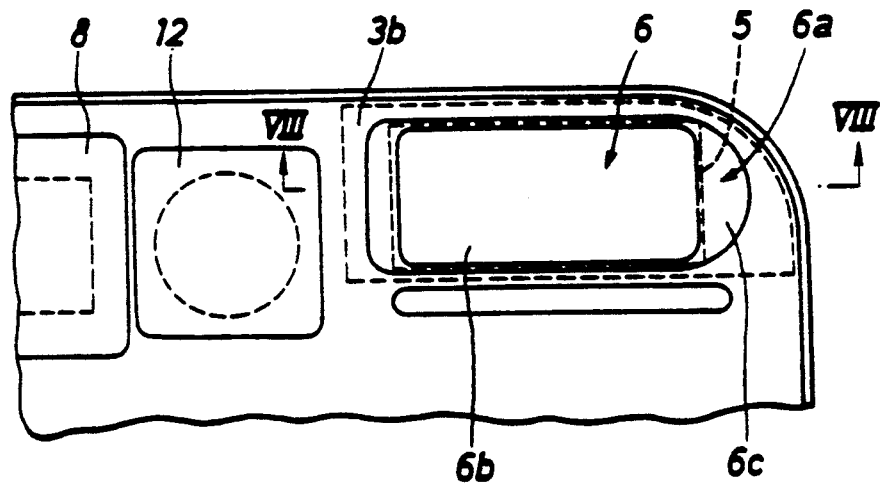
FIG. 7 is an enlarged view of a flash window.
Figure 8:
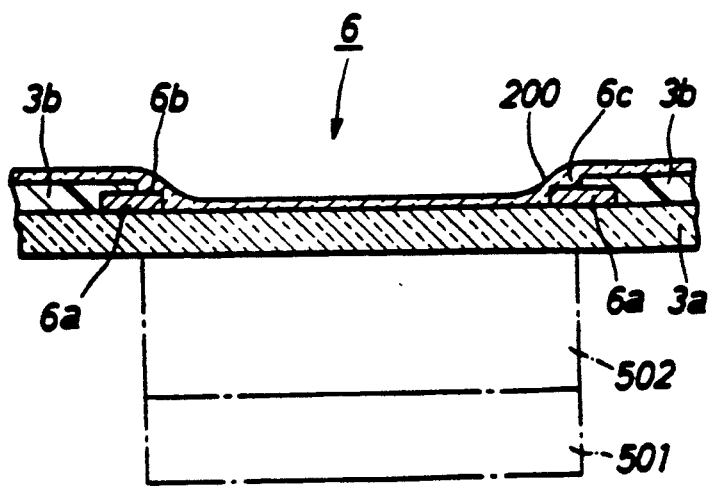
FIG. 8 is a sectional view taken along a line VIII—VIII in FIG. 7.

As shown in FIGS. 7 and 8, the flash window portion 6 is designed such that the reflecting film 6a is formed on the transparent member 3a except for a transmission range 6b of the flash window portion 6 prior to formation of, e.g., a black print layer 3b on the transparent member 3a. The reflecting film 6a is formed by depositing aluminum on the transparent member 3a. The black print layer 3b is formed on the reflecting film 6a so as to leave a frame 6c around the flash window portion 6.

A transparent hard coat layer 200 is formed on the print layer 3b of the transparent member 3a and the respective windows formed by the print layer 3b, i.e., the flash window portion 6, the viewfinder window portion 8, the AF window portions 10 and 12, and the AE light-receiving window portion 14. The layer 200 protects these windows.

With this arrangement, when the flash tube 501 emits light, the light is radiated on even the peripheral portion of the flash window portion 6, but is reflected by the reflecting film 6a. This prevents the print layer 3b constituting the flash window portion 6 from being burned by the light emitted from the flash tube 501.

The reflecting film 6a may be made of a metal other than aluminum, e.g., titanium or silver. If the film 6a is made of such a metal, good heat dissipation efficiency is realized, and the thermal influences can be reduced. Note that the reflecting film 6a is not limited to a metal film but may be constituted by a white resin member or the like which does not absorb light.

The reflecting film 6a may be bonded to the transparent member with an adhesive agent instead of vapor deposition.

In addition, the frame 6c of the reflecting film 6a formed around the flash window portion 6 serves as a member for preventing the print layer 3b from being burned by flash light, and also decorates the flash window portion 6.

Moreover, since the frame 6c of the reflecting film 6a prevents the mounting portion of the flash tube 501 from being seen from the outside, the appearance is improved.

As has been described above, in the camera with the electronic flash unit according to the present invention, since the frame around the flash window of the cover member is constituted by the reflecting film, harmful light emitted from the flash tube is reflected by the reflecting film, and is not absorbed by the print portion. Therefore, burning of the print portion constituting the flash window can be prevented. Hence, discoloring or melting of the print portion can be prevented.

In addition, since the frame around the flash window is constituted by the reflecting film, a decorative effect can be obtained for the flash window. Moreover, this provides a covering effect, i.e., preventing the mounting portion of the flash tube and the like from being seen from the outside. Hence, the appearance of the camera is improved.

What is claimed is:

1. A camera, comprising:
a main body;
a front cover covering the main body, the front cover including a first transparent portion, and a second portion including an opening disposed adjacent to said first transparent portion, said second portion being in contact with the first transparent portion;
a flash unit disposed adjacent the front cover for producing a flash of light through the opening; and
reflecting means positioned adjacent the opening for preventing the flash of light from impinging on the second portion.

2. A camera according to claim 1, wherein the first transparent portion is disposed adjacent the flash unit between the flash unit and the second portion.

3. A camera according to claim 2, wherein the reflecting means is disposed between the flash unit and the first transparent portion.

4. A camera according to claim 2, wherein the reflecting means is disposed between the flash unit and the first transparent portion and is in contact with the first transparent portion.

5. A camera according to claim 2, wherein the reflecting means is disposed between the first transparent portion and the second portion.

6. A camera according to claim 5, wherein the reflecting means is in contact with both the first transparent portion and the second portion.

7. A camera according to claim 1, wherein the reflecting means surrounds the opening and has an inner circumferential edge defining the perimeter of the opening.

8. A camera according to claim 7, wherein the reflecting means extends radially from the perimeter of the opening between the second portion and the flash unit.

9. A camera comprising:
a main body;
a flash unit provided on the main body for emitting a flash light; and
a front cover covering the main body and the flash unit, the front cover including, a first transparent portion;
a second portion provided on the first transparent portion, including an opening for emitting the flash light of the flash unit; and
reflecting means for the flash light of the flash unit positioned between the flash unit and the second portion, sot hat the reflecting means prevents the second portion from being deteriorated by the flash light.

10. The camera of claim 9, wherein said reflecting means is a metal film.

11. The camera of claim 1, wherein said reflecting means is a metal film.

12. The camera of claim 6, wherein said reflecting means is a metal film.

13. The camera of claim 10, wherein said metal film is composed of aluminum, titanium or silver.

14. The camera of claim 11, wherein said metal film is composed of aluminum, titanium or silver.

15. The camera of claim 12, wherein said metal film is composed of aluminum, titanium or silver.

* * * * *

UNITED STATES PATENT AND TRADEMARK OFFICE
CERTIFICATE OF CORRECTION

PATENT NO. : 5,146,251

DATED : September 08, 1992

INVENTOR(S) : Shizuo Ishii et al.

It is certified that error appears in the above-identified patent and that said Letters Patent is hereby corrected as shown below:

Claim 9, Column 8, Line 44 change "sot hat" to
--so that--.

Signed and Sealed this

Fourth Day of January, 1994

Attest:

BRUCE LEHMAN

Attesting Officer     Commissioner of Patents and Trademarks